(12) United States Patent
Ahmed

(10) Patent No.: US 7,656,332 B2
(45) Date of Patent: Feb. 2, 2010

(54) METHOD AND APPARATUS FOR A MULTI-MODE MULTI-RATE TELEMETRY TRANSMITTER

(75) Inventor: Walid Khairy Mohamed Ahmed, Tinton Falls, NJ (US)

(73) Assignee: Cobham Defense Electronic Systems Corporation, Bolton, MA (US)

( * ) Notice: Subject to any disclaimer, the term of this patent is extended or adjusted under 35 U.S.C. 154(b) by 50 days.

(21) Appl. No.: 11/859,999

(22) Filed: Sep. 24, 2007

(65) Prior Publication Data

US 2008/0211688 A1 Sep. 4, 2008

Related U.S. Application Data

(60) Provisional application No. 60/853,101, filed on Oct. 20, 2006.

(51) Int. Cl.
*H03M 1/66* (2006.01)
(52) U.S. Cl. ...................... 341/144; 341/123
(58) Field of Classification Search ................ 341/122, 341/123, 144, 141
See application file for complete search history.

(56) References Cited

U.S. PATENT DOCUMENTS 6,456,887 B1 * 9/2002 Dudding et al. .............. 607/60
7,042,367 B2 * 5/2006 Gardner et al. ........... 340/853.3
7,088,972 B2 8/2006 Brown et al.
7,375,667 B2 * 5/2008 Poulton et al. ............. 341/144
7,418,028 B2 * 8/2008 Feher ........................ 375/141
2006/0083320 A1 4/2006 Feher
2006/0093049 A1 5/2006 Jensen et al.

FOREIGN PATENT DOCUMENTS

EP 1 067 688 A2 1/2001
WO WO 01/58033 A1 8/2001

OTHER PUBLICATIONS

Simone L et al: "Novel digital platform for deep space transponders: the transmitter side" Aerospace Conference, 2004. Proceedings. 2004 IEEE Big Sky, MT, USA Mar. 6-13, 2004, Piscataway, NJ USA, IEEE, US, Mar. 6, 2004, pp. 1446-1452 vol. 3.
International Search Report, International application No. PCT/US2007/022164, International filing date Oct. 17, 2007.

* cited by examiner

*Primary Examiner*—Brian Young

(57) ABSTRACT

A method and apparatus for a multi-mode and multi-rate telemetry transmitter includes a digital baseband lineup, a digital-to-analog converter ("DAC"), and an analog reconstruction filter. The digital baseband lineup may be programmed to any desired bit rate, enabling the transmitter to support multi-rate capabilities. Different coefficients and numerical values may be programmed in the digital baseband lineup to support any desired modulation scheme, enabling the transmitter to support multi-mode capabilities. The digital baseband lineup may be designed by implementing up-sampling stages, down-sampling stages, and digital filters in a variety of arrangements.

17 Claims, 5 Drawing Sheets

METHOD AND APPARATUS FOR A MULTI-MODE MULTI-RATE TELEMETRY TRANSMITTER

CLAIM OF PRIORITY

This application claims the benefit of the U.S. provisional application 60/853,101, filed on Oct. 20, 2006, which is hereby incorporated by reference.

FIELD OF THE INVENTION

This invention relates to telemetry transmitters, specifically to such transmitters used for transmitting telemetry data from moving objects to receiving locations.

BACKGROUND OF THE INVENTION

Telemetry is a science of measuring data at remote locations and reporting that data to desired receiving points. The Range Commanders Council ("RCC") government telemetry group publishes the IRIG 106-04 specification document that defines the telemetry standard. The telemetry standard supports many modulation schemes that fall under the general modulation family of continuous phase modulation ("CPM"). SOQPSK and PCM/FM are just two examples of modulation schemes that are part of the family of CPM.

Telemetry transmitters are used in various commercial applications as well as other applications. For example, they can be utilized as part of an on-board diagnostic system for satellites, space modules, trains, missiles, smart projectiles, planes and other aircraft. The transmitters' main function is to send status data to receiving stations for record-keeping, decision making, and alerting purposes that will allow operations to be successful and effective.

The traditional method of building telemetry transmitters was to utilize analog components. The analog circuit architectures were important to preserve the linearity and quality of the transmitted signal. However, analog components are typically expensive, and they use significant current.

Also, traditional analog architectures are not capable of being flexible to meet a variety of bandwidth requirements. For example, many analog circuit architectures utilize band specific components that limit multi-mode capabilities. Therefore, a single transmitter cannot support multiple modes unless the actual analog components are changed or multiple transmitter lineups are utilized. Even then, one is still constrained by the actual analog components existing in the transmitter.

Another disadvantage is that a telemetry transmitter that is using a traditional analog architecture is limited in supporting multi-rate capabilities. When designing telemetry transmitters, a specific transmission data rate is chosen. Then specific analog components are used and tuned to accommodate that specific transmission data rate. Therefore, a single transmitter cannot support multiple rates unless the actual analog components are changed, multiple clocks are utilized, or multiple transmitter lineups are used, which is significantly limiting.

Accordingly, there is a need for architectures and methods for telemetry transmitters that support both multi-mode and multi-rate capabilities. Specifically, there is a need for a telemetry transmitter that can accommodate any one of a variety of rates and modulation schemes using a single transmitter lineup without having to replace internal components.

BRIEF SUMMARY

According to one aspect of the invention, a multi-rate telemetry transmitter comprises a first digital baseband lineup. A first digital-to-analog converter is in communication with the first digital baseband lineup. A first analog reconstruction filter is in communication with the first digital-to-analog converter wherein the first digital baseband lineup is programmable to support any one of a plurality of bit rates.

According to another aspect of the invention, a multi-rate telemetry transmitter comprises a first digital baseband lineup. A first digital-to-analog converter is in communication with the first digital baseband lineup. A first analog reconstruction filter is in communication with the first digital-to-analog converter wherein the first digital baseband lineup is programmable to support any one of a plurality of bit rates. Also, the first digital baseband lineup is programmable to support any one of a plurality of modulation schemes.

According to another aspect of the invention, there is a method for supporting multi-rate capabilities in a telemetry transmitter. The method comprises providing a digital baseband lineup, wherein the digital baseband lineup is programmable to support any one of a plurality of bit rates. A digital-to-analog converter is provided to be in communication with the digital baseband lineup. An analog reconstruction filter is provided to be in communication with the digital-to-analog converter. Then one programs the digital baseband lineup to support a desired bit rate.

According to another aspect of the invention, there is a method for supporting multi-rate capabilities in a telemetry transmitter. The method comprises providing a digital baseband lineup, wherein the digital baseband lineup is programmable to support any one of a plurality of bit rates. A digital-to-analog converter is provided to be in communication with the digital baseband lineup. An analog reconstruction filter is provided to be in communication with the digital-to-analog converter. Then one programs the digital baseband lineup to support a desired bit rate. Also, one programs the digital baseband lineup to support a desired modulation scheme.

According to another aspect of the invention, there is a method for supporting multi-rate capabilities in a telemetry transmitter. The method comprises programming a digital baseband lineup to support a desired bit rate, wherein the digital baseband lineup is programmable to support any one of a plurality of bit rates. A plurality of buffered data symbols are processed via the digital baseband lineup that outputs a digital signal. The digital signal is converted to an analog signal. Then the analog signal is filtered.

Other systems, methods, features and advantages of the invention will be, or will become, apparent to one with skill in the art upon examination of the following figures and detailed description. It is intended that all such additional systems, methods, features and advantages be included within this description.

BRIEF DESCRIPTION OF THE DRAWINGS

The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PRESENTLY PREFERRED EMBODIMENTS

Some of this material is based upon work supported by the Army Contracting Agency—Southern Region—Yuma under Contract No. W9124R-05-D-0201. Any opinions, findings and conclusions or recommendations expressed in this material are those of the author(s) and do not necessarily reflect the views of the Army Contracting Agency.

Figure 1:
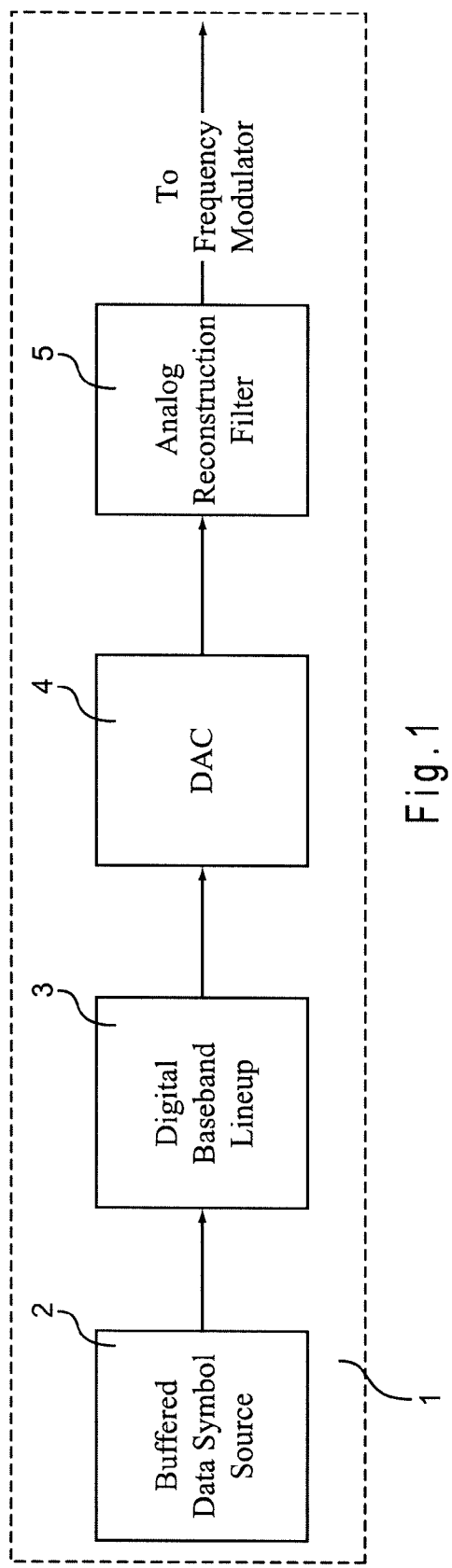
FIG. 1 is a block diagram illustrating a buffered data symbol source, a digital baseband lineup, a digital-to-analog converter, and an analog reconstruction filter according to one aspect of the invention.

Embodiments of the invention include methods and apparatus for a telemetry transmitter. For illustration purposes, FIG. 1 represents a general telemetry transmitter module 1. Typical components in such a telemetry transmitter module would include, but are not limited to, clocks, baseband architecture, modulation elements, and power amplifiers.

More specifically, FIG. 1 is a block diagram illustrating relevant portions of a telemetry transmitter according to one aspect of the invention. The telemetry transmitter includes a buffered data symbol source 2, a digital baseband lineup 3, a digital-to-analog converter ("DAC") 4, and an analog reconstruction filter 5. The buffered data symbol source 2 generates a stream of buffered data symbols, $\alpha_n$, at a desired bit rate, $R_b$. For example, the buffered data symbol source 2 can comprise a binary bit source that provides random binary bits to a IRIG 106-04 differential encoder/pre-coder. The IRIG 106-04 differential encoder/pre-coder differentially encodes the binary bits to produce the ternary modulation symbols, buffered data symbols $\alpha_n$. The buffered data symbols an would be generated at any desired bit rate, $R_b$. For example, a bit rate of 20 Mbps or less may be provided, such as 0.625 Mbps, 1.25 Mbps, 2.5 Mbps, 5.0 Mbps, 10 Mbps, or 20 Mbps.

Fewer or more components of the telemetry transmitter may be provided. For example, there may be an interface between the buffered data symbol source 2 and the digital baseband lineup 3. Alternatively, the interface is incorporated in the buffered data symbol source 2. The interface may include one or more data buffers and/or a data synchronizer. The interface may be operated in a synchronous mode or an asynchronous mode. In synchronous mode, the buffered data symbol source 2 and the digital baseband lineup 3 are synchronized in time via, for example, the data synchronizer. In asynchronous mode, the digital baseband lineup 3 may estimate data or bit start and end timings. In either mode, the data buffers may accumulate data and reproduce the data at desired rates and/or timings. Components of the telemetry transmitter, shown in FIG. 1, can be implemented in a single field programmable gate array ("FPGA"), other programmable hardware, or in separate chip architectures.

The telemetry transmitter illustrated in FIG. 1 is programmable to support multi-rate capabilities. For example, one, including the user, may program the digital baseband lineup 3 to accommodate any desired $R_b$. In addition, these components support multi-mode capabilities. For example, one could program different coefficients and numerical values in the digital baseband lineup 3 to support any desired modulation scheme. Similarly, one could program the analog reconstruction filter 5 to better accommodate a specific modulation scheme that is chosen. Consequently, the DAC 4 would have enough bandwidth to accommodate whichever modulation scheme that is chosen. Possible modulation schemes include, but are not limited to, SOQPSK and PCM/FM.

Figure 2:
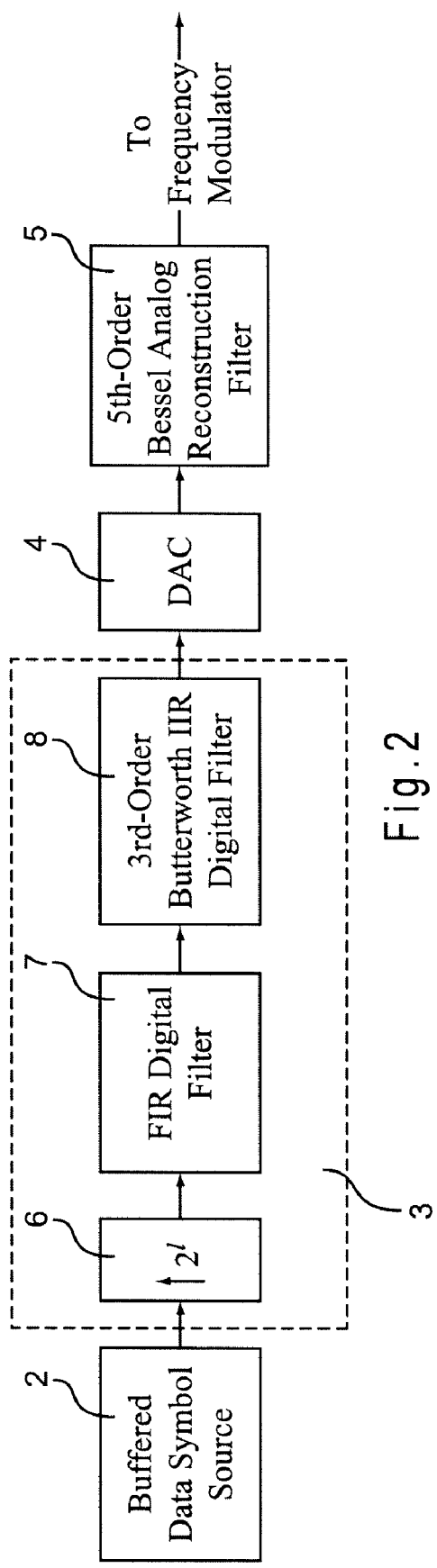
FIG. 2 is a block diagram illustrating a digital baseband lineup according to another aspect of the invention.

A telemetry transmitter according to another aspect of the invention is illustrated in FIG. 2. The digital baseband lineup 3 includes an up-sampling stage 6, a finite impulse response ("FIR") digital filter 7, and an infinite impulse response ("IIR") digital filter 8. The IIR digital filter 8 can also be a FIR digital filter. This approach enables a clock rate to be tunable within a range, $R_{clk,min} \leq R_{clk} \leq R_{clk,max}$. The clock rate for the tunable approach or a fixed approach may be, for example, 40 Mhz. The clock tuning can be done by a cascade of a crystal clock and a tunable phase-locked-loop ("PLL"). Buffered data symbols $\alpha_n$ are up-sampled by $2^l$, in which l is any desired numerical value, via the up-sampling stage 6. The sampling rate, $F_s$, can be adjusted such that $F_s = R_{clk} = 2^l R_b$. Then the data samples outputted by the up-sampling stage 6 are provided to the FIR digital filter 7 that pulse-shapes the samples. Therefore, the pulse-shaping function, g(t), associated with the FIR digital filter 7 is sampled directly at $2^l R_b$.

The samples at the output of the FIR digital filter 7 are further processed by the IIR digital filter 8, which removes excess noise and interference in the spectrum. The IIR digital filter 8 can be a $3^{rd}$-order Butterworth filter designed with a bandwidth in the range of 0 to $2R_b$. For example, the bandwidth may be approximately $0.24R_b$. The digital output of the IIR digital filter 8 then is converted to an analog signal via the DAC 4. The analog signal from the output of the DAC 4 is provided to the analog reconstruction filter 5, which serves as an anti-aliasing filter. The analog reconstruction filter 5 can be a $5^{th}$-order Bessel filter designed with a bandwidth in a range of numerical values. For example, the bandwidth may be approximately $0.75R_b$. In this approach, the analog reconstruction filter 5 will be programmable, scalable to the bit rate, $R_b$, in order to suppress images without distorting the in-band signal. The output of the analog reconstruction filter 5 then proceeds to a frequency modulator. Alternatively, the output may be provided to a phase modulator.

Figure 3:
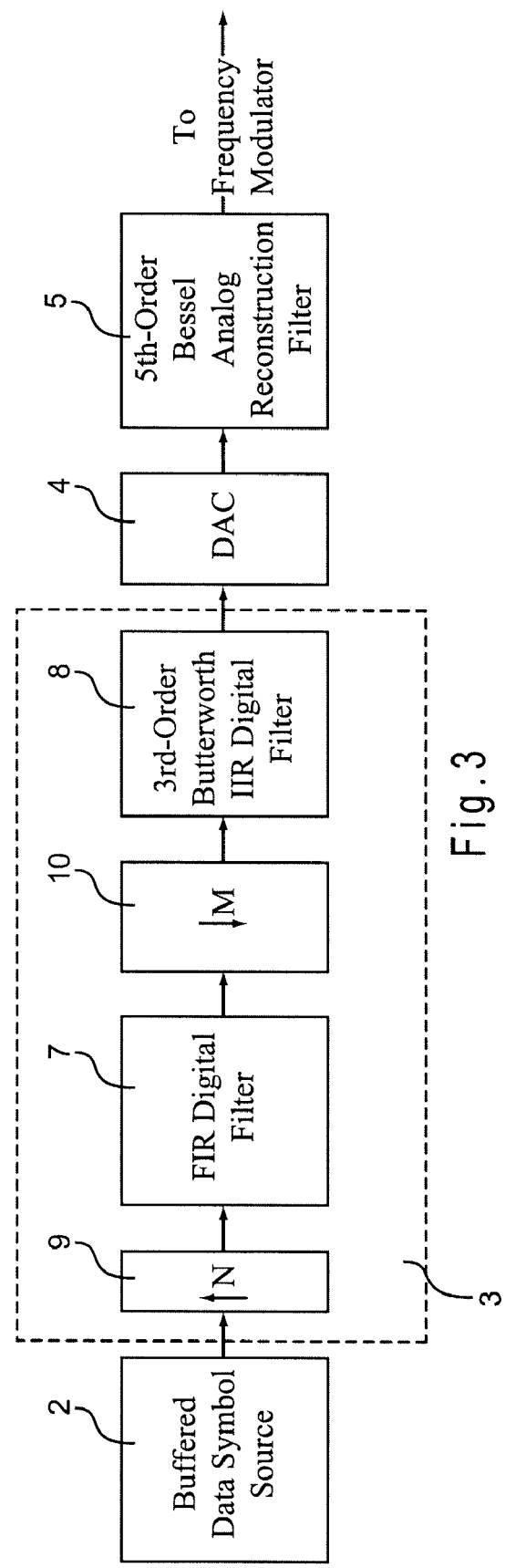
FIG. 3 is a block diagram illustrating a digital baseband lineup according to another aspect of the invention.

A telemetry transmitter according to another aspect of the invention is illustrated in FIG. 3. The digital baseband lineup 3 includes an up-sampling stage 9, a FIR digital filter 7, a down-sampling stage 10, and a IIR digital filter 8. The IIR digital filter 8 can also be a FIR digital filter. In this approach, the sampling rate, $F_s$, is fixed at a clock rate, $R_{clk}$. Buffered data symbols $\alpha_n$ are up-sampled by N, where N is any desired integer, via the up-sampling stage 9. Then the data samples outputted by the up-sampling stage 9 are provided to the FIR digital filter 7 that pulse-shapes the samples. The samples at the output of the FIR digital filter 7 are down-sampled by M via the down-sampling stage 10, where M is any desired integer. Therefore, the pulse-shaping function, g(t), associated with the FIR digital filter 7 is sampled directly at M/N*$(R_b)$. For example, the ratio M/N may be selected such that M/N≧2.

After the down-sampling stage 10, the samples are further processed by the IIR digital filter 8, which removes excess noise and interference in the spectrum. The IIR digital filter 8 can be a $3^{rd}$-order Butterworth filter designed with a bandwidth in the range of 0 to $2R_b$. For example, the bandwidth may be approximately $0.24R_b$. The digital output of the IIR digital filter 8 then is converted to an analog signal via the DAC 4. The analog signal from the output of the DAC 4 is provided to the analog reconstruction filter 5, which serves as an anti-aliasing filter. The analog reconstruction filter 5 can be a 5$^{th}$-order Bessel filter designed with a bandwidth in the range of 0 to 0.5R$_{clk}$. For example, the bandwidth may be approximately 0.375R$_{clk}$. The output of the analog reconstruction filter 5 then proceeds to a frequency modulator. Alternatively, the output may be provided to a phase modulator.

Furthermore, additional digital filtering can be inserted after or before the up-sampling stage 9 and down-sampling stage 10 for better interpolation in order to achieve a fractional sampling rate adjustment that has a desired spectral performance. As an example, a low pass filter with a gain of N, where N is any desired integer, and a cut-off frequency of F$_s$/2N can be utilized after the up-sampling stage 9, and a low pass filter with a gain of M, where M is any desired integer, and a cut-off frequency of F$_s$/2M can be utilized before the down-sampling stage 10.

Figure 4:
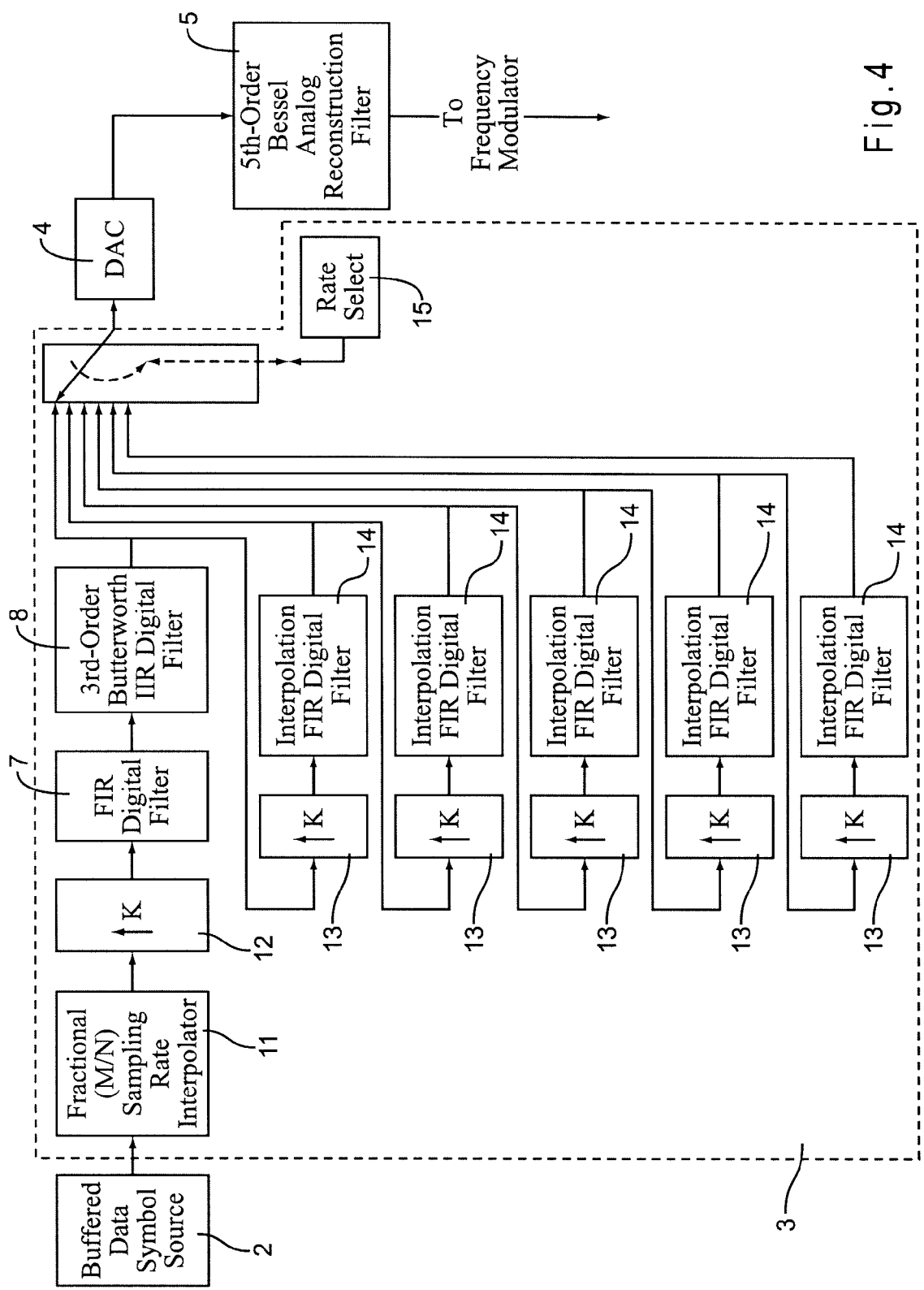
FIG. 4 is a block diagram illustrating a digital baseband lineup according to another aspect of the invention.

A telemetry transmitter according to another aspect of the invention is illustrated in FIG. 4. The digital baseband lineup 3 includes a fractional sampling rate interpolator stage 11, an up-sampling stage 12, a FIR digital filter 7, a IIR digital filter 8, a cascade of up-sampling stages 13, and a cascade of interpolation FIR digital filters 14. The IIR digital filter 8 can also be a FIR digital filter. In this approach, the sampling rate, F$_s$, is fixed at a clock rate, R$_{clk}$. Buffered data symbols α$_n$ are provided to the fractional sampling rate interpolator stage 11.

Figure 5:
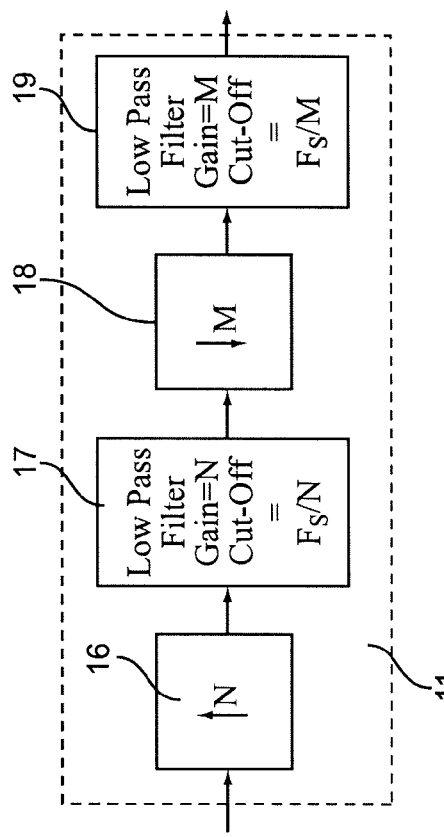
FIG. 5 is a block diagram illustrating a fractional sampling rate interpolator according to another aspect of the invention.

A fractional sampling rate interpolator stage 11 according to another aspect of the invention is illustrated in FIG. 5. This design comprises an up-sampling stage 16, a low pass filter 17, a down-sampling stage 18, and a low pass filter 19. Therefore, when the buffered data symbols α$_n$ enter the fractional sampling rate interpolator stage 11, they will be up-sampled by N, where N is any desired integer, via the up-sampling stage 16. Then the data samples outputted by the up-sampling stage 16 are provided to the low pass filter 17 with a gain of N and a cut-off frequency of F$_s$/2N. The output of the low pass filter 17 is down-sampled by M via the down-sampling stage 18, where M is any desired integer. After the down-sampling stage 18, the samples are further processed by the low pass filter 19 with a gain of M and a cut-off frequency of F$_s$/2M.

The output of the low pass filter 19 represents the output of the fractional sampling rate interpolator stage 11 illustrated in FIG. 4. Therefore, after the fractional sampling rate interpolator stage 11, the samples are up-sampled by K, where K is any desired integer, via the up-sampling stage 12. Then the data samples outputted by the up-sampling stage 12 are provided to the FIR digital filter 7 that pulse-shapes the samples. Therefore, the pulse-shaping function, g(t), associated with the FIR digital filter 7 is sampled directly at K*(M/N)*R$_b$. For example, the ratio M/N may be selected such that 1≦M/N<2. A desired value for K may be selected from a range of integers. For example, K could be set to equal 2.

The samples at the output of the FIR digital filter 7 are further processed by the IIR digital filter 8, which removes excess noise and interference in the spectrum. The IIR digital filter 8 can be a 3$^{rd}$-order Butterworth filter designed with a bandwidth in the range of 0 to 2R$_b$. For example, the bandwidth may be approximately 0.24R$_b$. The digital output of the IIR digital filter 8 can be directly sent to the DAC 4. However, a rate select switch 15 can divert the digital output of the IIR digital filter 8 through a cascade of up-sampling stages 13 and a cascade of interpolation FIR digital filters 14, as seen in FIG. 4.

Theoretically, the rate select switch 15 can be set such that the digital output of the IIR digital filter 8 is up-sampled by K, where K is any desired integer, via one of the up-sampling stages 13. A desired value for K may be selected from a range of integers. For example, the value for K might be set to equal 2. Then the data samples outputted by that stage are provided to one of the interpolation FIR digital filters 14. However, the rate select switch 15 can be set to any number of positions allowing the digital output of the IIR digital filter 8 to be processed through a desired series of up-sampling stages 13 and interpolation FIR digital filters 14. Therefore, the DAC 4 input is selected to be the output of one of the interpolation FIR digital filters 14. In particular, the output of an interpolation FIR digital filter 14 may be selected such that the F$_s$ matches the required input R$_b$. At the same time, unused interpolation FIR digital filters 14 may be disabled to save processing power.

Whichever path the digital output of the IIR digital filter 8 passes through, it is eventually provided to the DAC 4, which will convert it to an analog signal. The analog signal from the output of the DAC 4 is provided to the analog reconstruction filter 5, which serves as an anti-aliasing filter. The analog reconstruction filter 5 can be a 5$^{th}$-order Bessel filter designed with a bandwidth in the range of 0 to 0.5R$_{clk}$. For example, the bandwidth may be approximately 0.375R$_{clk}$. The output of the analog reconstruction filter 5 then proceeds to a frequency modulator. Alternatively, the output may be provided to a phase modulator.

Figure 6:
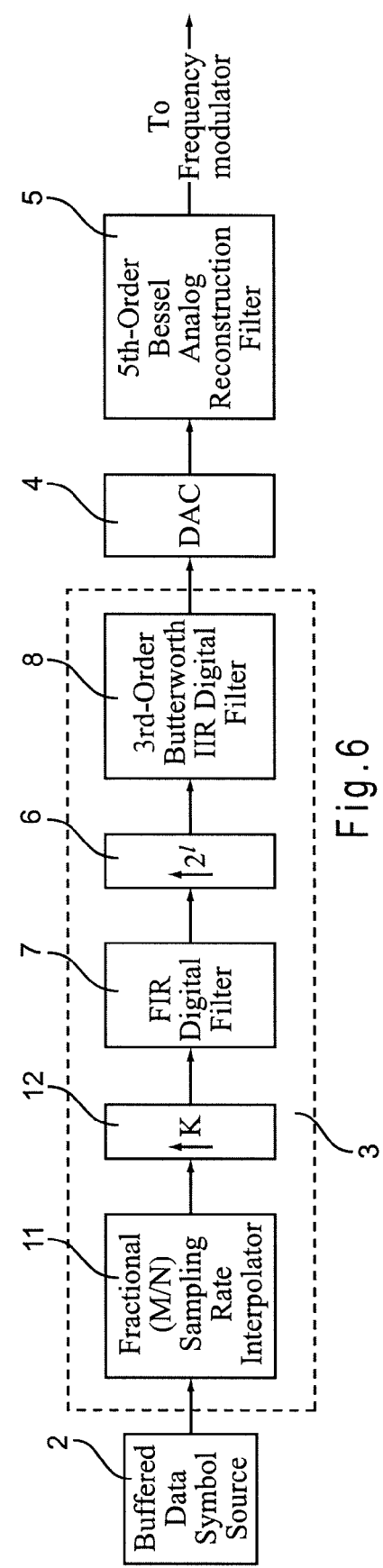
FIG. 6 is a block diagram illustrating a digital baseband lineup according to another aspect of the invention.

A telemetry transmitter according to another aspect of the invention is illustrated in FIG. 6. The digital baseband lineup 3 includes a fractional sampling rate interpolator stage 11, an up-sampling stage 12, a FIR digital filter 7, an up-sampling stage 6, and a IIR digital filter 8. The IIR digital filter 8 can also be a FIR digital filter. In this approach, the sampling rate, F$_s$, is fixed at a clock rate, R$_{clk}$. Buffered data symbols α$_n$ are provided to the fractional sampling rate interpolator stage 11. One suitable fractional sampling rate interpolator stage 11 is illustrated in FIG. 6, which is discussed in detail above. After the fractional sampling rate interpolator stage 11, the samples are up-sampled by K, where K is any desired integer, via the up-sampling stage 12. Then the data samples outputted by the up-sampling stage 12 are provided to the FIR digital filter 7 that pulse-shapes the samples. Therefore, the pulse-shaping function, g(t), associated with the FIR digital filter 7 is sampled directly at K*(M/N)*R$_b$. For example, the ratio M/N may be selected such that 1≦M/N<2. A desired value for K may be selected from a range of integers. For example, K could be set to equal 2.

The samples at the output of the FIR digital filter 7 are further up-sampled by 2$^l$, in which l is any desired numerical value, via the up-sampling stage 6. The samples outputted by the up-sampling stage 6 are processed by the IIR digital filter 8, which removes excess noise and interference in the spectrum. The IIR digital filter 8 can be a 3$^{rd}$-order Butterworth filter designed with a bandwidth in the range of 0 to 2R$_b$. For example, the bandwidth may be approximately 0.24R$_b$. The digital output of the IIR digital filter 8 then is converted to an analog signal via the DAC 4. The analog signal from the output of the DAC 4 is provided to the analog reconstruction filter 5, which serves as an anti-aliasing filter. The analog reconstruction filter 5 can be a 5$^{th}$-order Bessel filter designed with a bandwidth in the range of 0 to 0.5R$_{clk}$. For example, the bandwidth may be approximately 0.375R$_{clk}$. The output of the analog reconstruction filter 5 then proceeds to a frequency modulator. Alternatively, the output may be provided to a phase modulator.

Several other approaches may be implemented for the purpose of embodying the invention. For example, the design features of the various telemetry transmitters discussed above may be mixed and matched to accomplish similar results. Also, the present invention is not limited to a single transmitter lineup. A plurality of transmitter lineups utilizing the approaches discussed above as well as other approaches may be combined within the spirit of the invention.

It is intended that the foregoing detailed description be regarded as illustrative rather than limiting, and that it be understood that the following claims, including all equivalents, are intended to define the scope of this invention.

The invention claimed is:

1. A multi-rate telemetry transmitter, comprising:
a first digital baseband lineup;
a first digital-to-analog converter in communication with said first digital baseband lineup;
a first analog reconstruction filter in communication with said first digital-to-analog converter;
wherein said first digital baseband lineup is programmable to support any one of a plurality of bit rates; and
wherein said first digital baseband lineup includes:
an up-sampling stage; and
a FIR digital filter in communication with said up-sampling stage.

2. A transmitter as in claim 1, wherein said first digital baseband lineup is programmable to support any one of a plurality of modulation schemes.

3. A transmitter as in claim 1, further comprising:
a second digital baseband lineup;
a second digital-to-analog converter in communication with said second digital baseband lineup; and
a second analog reconstruction filter in communication with said second digital-to-analog converter;
wherein said second digital baseband lineup is programmable to support any one of a plurality of bit rates.

4. A transmitter as in claim 1, wherein said first digital baseband lineup includes a FIR digital filter.

5. A transmitter as in claim 1, wherein said first digital baseband lineup includes:
an up-sampling stage;
a FIR digital filter in communication with said up-sampling stage; and
a IIR digital filter in communication with said FIR digital filter.

6. A transmitter as in claim 1, wherein said first digital baseband lineup includes:
an up-sampling stage;
a FIR digital filter in communication with said up-sampling stage; and
a down-sampling stage in communication with said FIR digital filter.

7. A transmitter as in claim 1, wherein said first digital baseband lineup includes:
a fractional sampling rate interpolator stage;
an up-sampling stage in communication with said fractional sampling rate interpolator stage; and
a FIR digital filter in communication with said up-sampling stage.

8. A transmitter as in claim 1, wherein said first digital baseband lineup includes:
a fractional sampling rate interpolator stage; a first up-sampling stage in communication with said fractional sampling rate interpolator stage;
a FIR digital filter in communication with said first up-sampling stage;
a second up-sampling stage in communication with said FIR digital filter; and
an interpolation FIR digital filter in communication with said second up-sampling stage.

9. A transmitter as in claim 1, wherein said first digital baseband lineup includes:
a fractional sampling rate interpolator stage;
a first up-sampling stage in communication with said fractional sampling rate interpolator stage;
a FIR digital filter in communication with said first up-sampling stage; and a second up-sampling stage in communication with said FIR digital filter.

10. A method for supporting multi-rate capabilities in a telemetry transmitter, comprising:
providing a digital baseband lineup, wherein said digital baseband lineup is programmable to support any one of a plurality of bit rates;
providing a digital-to-analog converter to be in communication with said digital baseband lineup;
providing an analog reconstruction filter to be in communication with said digital-to-analog converter; and
programming said digital baseband lineup to support a desired bit rate;
wherein said digital baseband lineup includes:
an up-sampling stage;
a FIR digital filter in communication with said up-sampling stage; and
a IIR digital filter in communication with said FIR digital filter.

11. A method as in claim 10, further comprising:
programming said digital baseband lineup to support a desired modulation scheme.

12. A method as in claim 10, wherein said digital baseband lineup includes:
an up-sampling stage;
a FIR digital filter in communication with said up-sampling stage;
a down-sampling stage in communication with said FIR digital filter; and
a IIR digital filter in communication with said down-sampling stage.

13. A method as in claim 10, wherein said digital baseband lineup includes:
a fractional sampling rate interpolator stage;
an up-sampling stage in communication with said fractional sampling rate interpolator stage; and
a FIR digital filter in communication with said up-sampling stage.

14. A method as in claim 10, wherein said digital baseband lineup includes:
a fractional sampling rate interpolator stage;
a first up-sampling stage in communication with said fractional sampling rate interpolator stage;
a FIR digital filter in communication with said first up-sampling stage;
a second up-sampling stage in communication with said FIR digital filter; and
an interpolation FIR digital filter in communication with said second up-sampling stage.

15. A method as in claim 10, wherein said digital baseband lineup includes:
a fractional sampling rate interpolator stage;
a first up-sampling stage in communication with said fractional sampling rate interpolator stage;
a FIR digital filter in communication with said first up-sampling stage;
a second up-sampling stage in communication with said FIR digital filter; and
a IIR digital filter in communication with said second up-sampling stage.

16. A method for supporting multi-rate capabilities in a telemetry transmitter, comprising:
  programming a digital baseband lineup to support a desired bit rate, wherein said digital baseband lineup is programmable to support any one of a plurality of bit rates;
  processing a plurality of buffered data symbols using said digital baseband lineup to generate a digital signal;
  converting said digital signal to an analog signal; filtering said analog signal;
  up-sampling said plurality of buffered data symbols to produce samples;
  pulse-shaping said samples to produce an output; and
  filtering said output to produce said digital signal.

17. A method as in claim 16, further comprising:
  programming said digital baseband lineup to support a desired modulation scheme.

\* \* \* \* \*